(12) United States Patent
Kamitani

(10) Patent No.: US 11,554,651 B2
(45) Date of Patent: Jan. 17, 2023

(54) GLASS RUN

(71) Applicant: NISHIKAWA RUBBER CO., LTD., HIroshima (JP)

(72) Inventor: Yoshihiko Kamitani, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 177 days.

(21) Appl. No.: 17/010,120

(22) Filed: Sep. 2, 2020

(65) Prior Publication Data

US 2021/0078390 A1 Mar. 18, 2021

(30) Foreign Application Priority Data

Sep. 12, 2019 (JP) .............................. JP2019-165940

(51) Int. Cl.
B60J 10/50 (2016.01)
B60J 5/04 (2006.01)
B60J 10/76 (2016.01)

(52) U.S. Cl.
CPC ............. *B60J 10/50* (2016.02); *B60J 5/0402* (2013.01); *B60J 10/76* (2016.02)

(58) Field of Classification Search
CPC ........... B60J 5/0402; B60J 10/50; B60J 10/76
See application file for complete search history.

(56) References Cited

U.S. PATENT DOCUMENTS

| 7,487,615 | B2 * | 2/2009 | Watanabe | B60J 10/74 49/440 |
| 9,694,660 | B2 * | 7/2017 | Kameoka | B60J 10/74 |
| 9,845,000 | B2 * | 12/2017 | Kojima | B60J 5/0402 |
| 2004/0163596 | A1 | 8/2004 | Miles et al. | |
| 2009/0230817 | A1 | 9/2009 | Kurachi et al. | |
| 2017/0291480 | A1 * | 10/2017 | Kameoka | B60J 10/76 |

FOREIGN PATENT DOCUMENTS

| EP | 1862343 B1 | 12/2010 |
| JP | 4873992 B2 | 12/2011 |

* cited by examiner

*Primary Examiner* — Jason S Morrow
(74) *Attorney, Agent, or Firm* — Procopio Cory Hargreaves and Savitch LLP

(57) ABSTRACT

A glass run includes a body part including exterior and interior side walls and a bottom wall connecting the exterior and interior side walls; an exterior lip projecting from the exterior side wall toward the bottom wall and configured to slidably contact an exterior side of a door glass; and an interior lip projecting from the interior side wall toward the bottom wall and configured to slidably contact an interior side of the door glass. The interior lip includes a base end portion extending toward the bottom wall and is curved to be oriented toward an exterior of the vehicle as extending to its distal end portion, and the interior side wall includes a protuberance protruding toward the exterior, and the protuberance is positioned to be able to contact the interior lip when the interior lip is pressed toward an interior of the vehicle by the door glass to deform.

3 Claims, 7 Drawing Sheets

GLASS RUN

CROSS-REFERENCE TO RELATED APPLICATION

This application claims priority from Japanese Patent Application No. 2019-165940 filed on Sep. 12, 2019, which is incorporated herein by reference in its entirety and for all purposes.

BACKGROUND

The present disclosure relates to a glass run for guiding a door glass that is raised and lowered in a vehicle door.

Generally, doors provided on sides of an automobile include a door glass that can be raised and lowered to open and close an opening (window) formed in a door frame (sash portion), and a glass run for sealing a gap between the sash portion and the door glass. Specifically, a front glass run 100 is attached to a sash portion 3 of a front door 2 in an automobile 1, as illustrated FIG. 5. In this respect, a sash portion is also provided in a rear door 4 (not shown) as in the front door 2, and a rear glass run is attached to the sash portion. The glass run 100 receives an edge of the door glass 6 to seal a gap between the edge of the door glass 6 and the sash portion 3.

Such conventional glass run 100 has a known problem that for example, when the door glass 6 is rapidly closed, the door glass 6 received in the grass run 100 rattles between side walls of the glass run 100, and in that circumstance, the door glass 6, the side walls of the glass run 100, and a sealing lip formed in the glass run for supporting the door glass 6 collide and thereby make a louder rattling sound.

Thus, there is a need for effectively preventing the rattle of the door glass 6 received in the glass run 100. Japanese patent No. 4873992 presents an example of a structure for addressing the need. A structure of a glass run disclosed in Japanese patent No. 4873992 is described with reference to FIGS. 6 and 7. FIGS. 6 and 7 are a view illustrating a cross-section taken along a line A-A indicated in FIG. 5. While FIG. 6 particularly illustrates a state of a door glass where a window is opened, FIG. 7 illustrates a state of the door glass where a window is closed.

As illustrated in FIGS. 6 and 7, the glass run 100 is, as described above, attached to an inner circumference portion of the sash portion 3 consisting of outer and inner panels 3a, 3b and a retainer 3c of the door 2. The glass run 100 includes a body part 101 that is generally U-shaped in cross-sectional view, and exterior and interior lips 105, 106 extending from top ends of respective exterior and interior side walls 102, 103 of the body part 101 toward a bottom wall 104 and configured to slidably guide the door glass 6 to sandwich the door glass 6. The glass run 100 further includes a sub-lip 107 extending generally parallel to the interior lip 106 from the interior side wall 103 of the body part 101 and having a length smaller than that of the interior lip 106.

When the door glass 6 is moved from an opened state as shown in FIG. 6 to a closed state, the interior and exterior lips 106, 105 of such glass run 100 deform toward the respective interior and exterior side walls 103, 102 to sandwich the door glass 6, as illustrated in FIG. 7. In doing so, the interior lip 106 abuts with and is supported by the sub-lip 107. When the door glass 6 moves toward an interior of the automobile (vehicle) in this state, the interior lip 106 attempts to further deform toward the interior side wall 103 (as shown in broken lines in FIG. 7); however, reaction force of the interior lip 106 against the movement of the door glass 6 is increased since the interior lip 106 is supported by the sub-lip 107 on an interior side wall 103 side. As a result, an amount of the deformation of the interior lip 106 is decreased and rattles of the door glass 6 can be prevented to thus reduce rattling noise of the door glass 6.

SUMMARY

The glass run claimed in Japanese patent No. 4873992 can reduce the rattle of the door glass and the rattling noise created thereby to some extent since the interior lip is supported by the sub-lip, as described above. However, the deformation of the interior lip results in producing a noise when particularly a base end portion of the sub-lip collides with the interior lip. Although the rattling noise that had been previously produced can be thus reduced, another cause leads to production of another noise. Whereas, as described above, the interior lip is supported by the sub-lip and the rattle of the door glass can be thereby reduced to some extent, there is still the need for more effective prevention of the rattle and hence further reduction of the rattling noise.

The present disclosure is made in view of the foregoing problem, and an object of the present disclosure is to prevent the rattle of the door glass and effectively reduce the rattling noise of the door glass.

The present disclosure is enabled by a glass run including a protuberance on an interior side wall, as well as an interior sealing lip with a shape having a warpage direction opposite to that of conventional one, to achieve the object.

Specifically, a glass run according to the present disclosure is a glass run adapted to be attached along a frame body of a vehicle door and to seal a gap between the frame body and a door glass for opening and closing a window of the door, the glass run comprising: a body part including exterior and interior side walls and a bottom wall connecting the exterior and interior side walls; an exterior lip projecting from the exterior side wall toward the bottom wall and configured to slidably contact an exterior side of the door glass; and an interior lip projecting from the interior side wall toward the bottom wall and configured to slidably contact an interior side of the door glass, wherein the interior lip includes a base end portion extending toward the bottom wall and is curved to be oriented toward an exterior of the vehicle as extending to its distal end portion, and the interior side wall includes a protuberance protruding toward the exterior of the vehicle, and the protuberance is positioned to be able to contact the interior lip when the interior lip is pressed toward an interior of the vehicle by the door glass to deform.

In the glass run according to the present disclosure, when the door glass moves toward the interior or exterior of the vehicle due to, for example, rapid closure of the door glass or movements of the door, the interior lip deforms toward the interior of the vehicle while supporting the door glass and the interior lip then contacts to and is supported by the protuberance of the interior side wall of the glass run, thus enabling increased reaction force of the interior lip against the door glass. Particularly, the interior lip is supported by the protuberance formed on the interior side wall per se of the glass run, rather than another lip, so that the interior lip thus more firmly supported and the reaction force of the interior lip against the door glass thus can be further increased. No noise is then produced by collision between the other lip supporting the interior lip and the interior side wall of the glass run, thus enabling reduced rattling noise of the door glass. Further, the interior lip of the glass run according to the present disclosure includes the base end portion extending toward the bottom wall and is curved to be oriented toward the exterior of the vehicle as extending to its distal end portion, so that the interior lip can be positioned closer to the protuberance as compared to the shape of the conventional sealing lip and thus, noise generated by contact of the interior lip and the protuberance can be reduced.

In the glass run according to present disclosure, the interior lip preferably has an apex of a curve positioned most proximate to the protuberance between the base end portion and the distal end portion.

In this way, when the interior lip is pressed toward the interior of the vehicle by the door glass to deform, the apex of the curve of the interior lip can first contact the protuberance. A fulcrum of the interior deformation of the interior lip is first the base end portion, and is then the apex of the curve when the apex of the curve contacts the protuberance, and the interior lip thus deforms. Therefore, a distance from the fulcrum to the distal end portion that is a point of application and provides a most exterior protrusion to contact the door glass becomes smaller during the deformation of the interior lip, thus enabling increased reaction force of the interior lip against the door glass as the interior lip deforms. This enables prevention of rattles of the door glass, and thus reduced rattling noise of the door glass.

In the glass run according to the present disclosure, the interior lip is preferably configured such that when the interior lip is pressed toward the interior of the vehicle by the door glass to deform, the apex of the curve contacts the protuberance and then a portion between the apex of the curve and the distal end portion contacts the protuberance.

In this way, after the fulcrum of the interior deformation of the interior lip shifts from the base end portion to the apex of the curve as described above, the portion between the apex of the curve and the distal end portion then contacts the protuberance as the deformation develops, thus rendering the fulcrum of the deformation to be the portion between the apex of the curve and the distal end portion. A further smaller distance from the fulcrum to the distal end portion that is the point of application is thus provided during the deformation of the interior lip, enabling more increased reaction force of the interior lip against the door glass as the interior lip deforms. This enables further prevention of the rattles of the door glass, and thus further reduced rattling noise of the door glass.

In the glass run according to the present disclosure, the rattle of the door glass can be prevented and the rattling noise of the door glass can be reduced.

DETAILED DESCRIPTION

Embodiments of the present disclosure are described below with reference to the drawings. The following description of preferred embodiments is merely an example in nature, and is not intended to limit the present disclosure, application method of the present disclosure, or use of the present disclosure.

A glass run according to an embodiment of the present disclosure is described with reference to FIGS. 1, 2A, 2B, 2C and 5.

Figure 5:
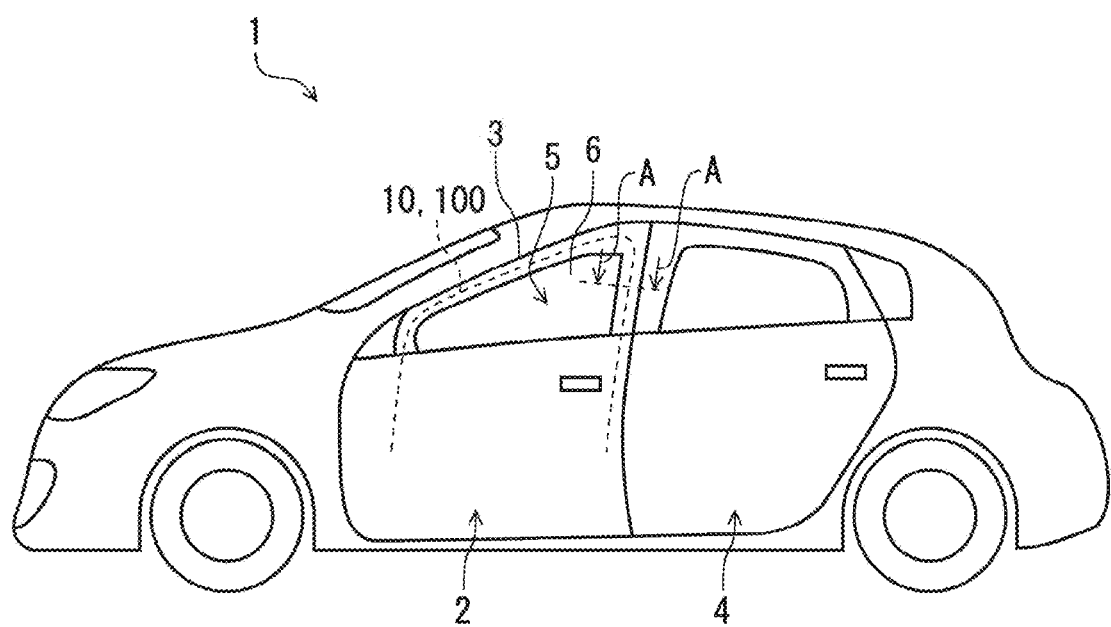
FIG. 5 is a view illustrating a left side of an automobile.
Figure 6:
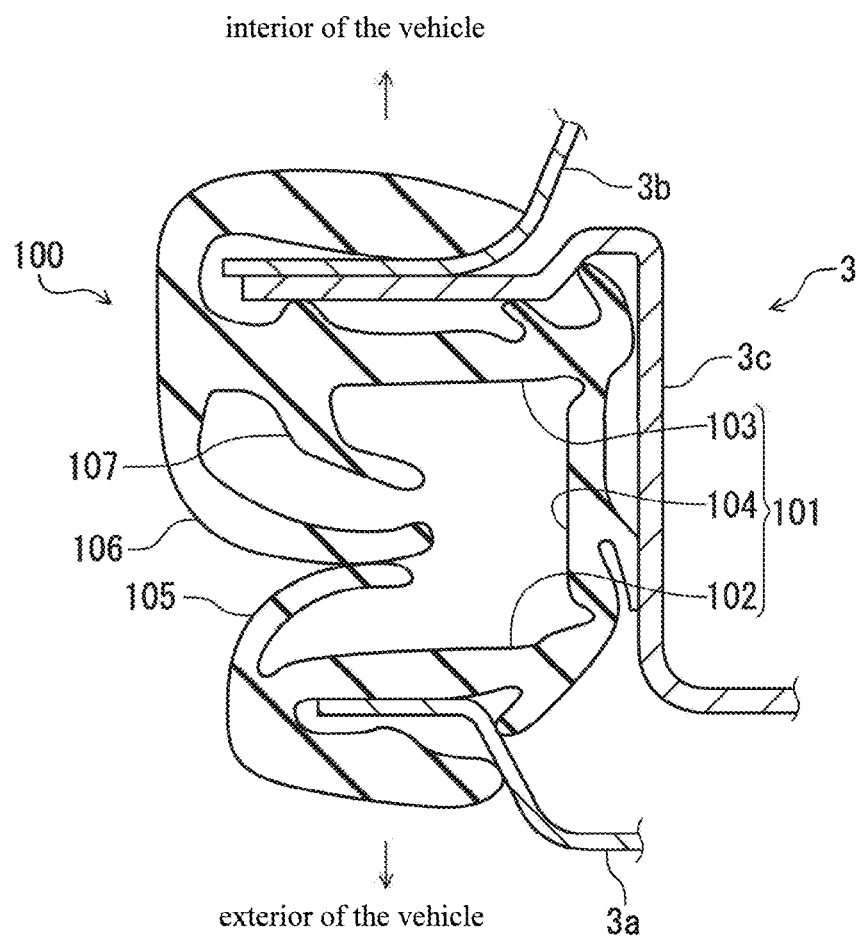
FIG. 6 is a cross sectional view illustrating a glass run according to an aspect of prior art when a door glass is opened, which is taken along the line A-A indicated in FIG. 5.
Figure 7:
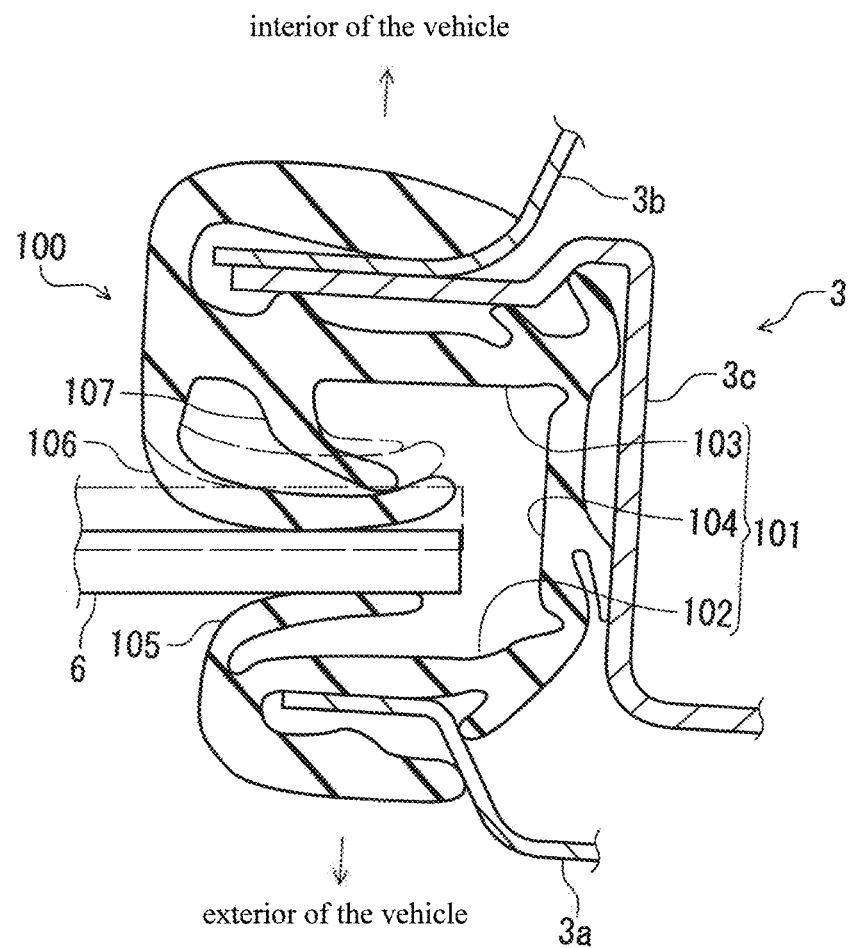
FIG. 7 is a cross sectional view illustrating the glass run according to the aspect of the prior art when the door glass is closed, which is taken along the line A-A indicated in FIG. 5.

In an automobile illustrated in FIG. 5, an automobile (vehicle) is shown with reference numeral 1, a (front) door shown with reference numeral 2, a sash portion (frame body) of the (front) door shown with reference numeral 3, a (rear) door shown with reference numeral 4, a window formed from the sash portion shown with reference numeral 5, and a door glass for opening and closing the window shown with reference numeral 6. A grass run 10 is provided on the sash portion 3.

Figure 1:
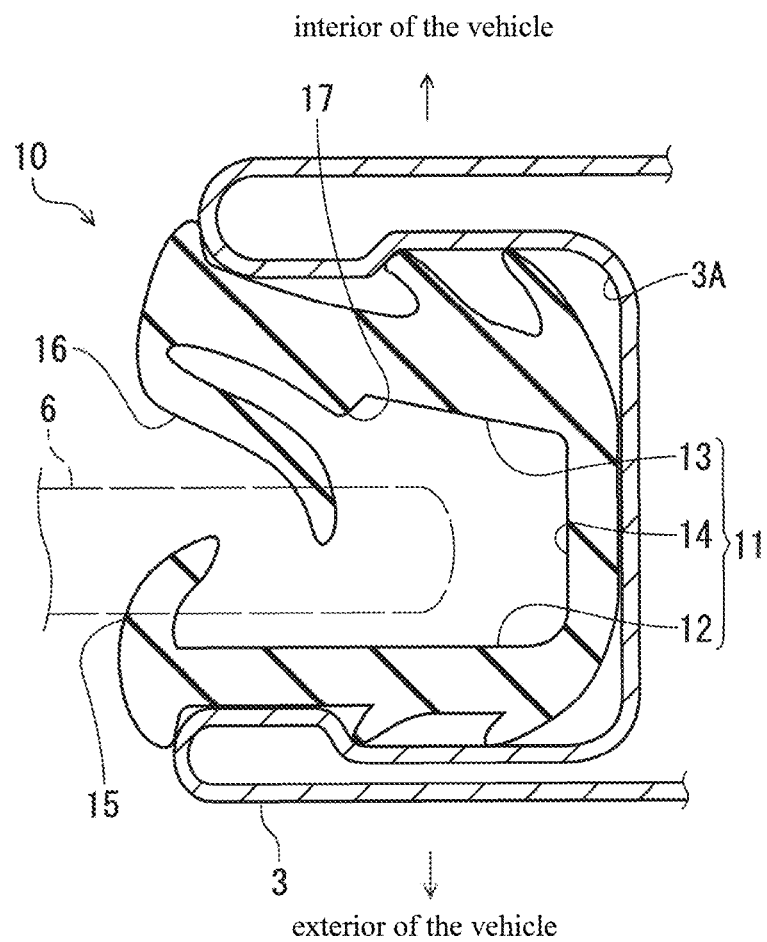
FIG. 1 is a cross sectional view illustrating a glass run according to an embodiment of the present disclosure, which is taken along a line A-A indicated in FIG. 5.

FIG. 1 shows a cross section taken along the line A-A indicated in FIG. 5 and is a view particularly illustrating a cross sectional structure of the glass run 10 attached to the sash portion 3 of the door 2. As illustrated in FIG. 1, the glass run 10 includes a body part 11 generally U-shaped in cross-sectional view and fitted into and attached to a recessed portion 3A formed in the sash portion 3. The body part 11 includes exterior and interior side walls 12, 13 and a bottom wall 14 connecting the exterior and interior side walls 12, 13. While the exterior side wall 12 includes an exterior lip 15 extending from a top end thereof (an end most distant from the bottom wall 14) toward the bottom wall 14, the interior side wall 13 includes an interior lip 16 extending from a top end thereof (an end most distant from the bottom wall 14) toward the bottom wall 14 and curved to extend toward an exterior of the vehicle as the interior lip 16 extends toward its distal end portion. Thus, the interior lip 16 is shaped to have a curve oriented opposite to that of the conventional sealing lip. The exterior and interior lips 15, 16 slidably contact respective exterior and interior sides of the door glass 6 to sandwich the door glass 6. A protuberance 17 protruding toward the exterior of the vehicle is formed on the interior side wall 13. The protuberance 17 is formed at a position where the protuberance 17 can contact the interior lip 16 when the interior lip 16 deforms, as explained below. FIG. 1 illustrates a rolled sash formed from one plate as the sash portion 3; however, the embodiment is not limited to this configuration. The sash portion 3 formed from two or more plates may be adopted.

The glass run 10 is formed of an elastic material. A linear portion of the glass run 10 is particularly formed of an elastic material, for example, a thermoplastic elastomer, such as, a styrenic thermoplastic elastomer (TPS), an olefinic thermoplastic elastomer (TPO), or various rubbers, and formed by means of extrusion molding, for example. A corner portion of the glass run 10 is also formed of a material similar to those described above, for example, and by means of molding, such as injection molding. The molding methods and the materials of the glass run 10 are not limited to the foregoing methods and materials and other known methods and materials can be appropriately used.

Next, a detailed structure of the interior lip 16 and the protuberance 17 of the glass run 10 according to the embodiment, as well as deformation of the interior lip 16 as the door glass 6 moves will be described with reference to FIGS. 2A, 2B, and 2C. For the reason of clarifying deformation of the interior lip 16, FIGS. 2A, 2B, and 2C only shows the interior side wall 13, the interior lip 16, and the protuberance 17 of the glass run 10 according to the embodiment and the door glass 6, and omits other components.

Figure 2A:
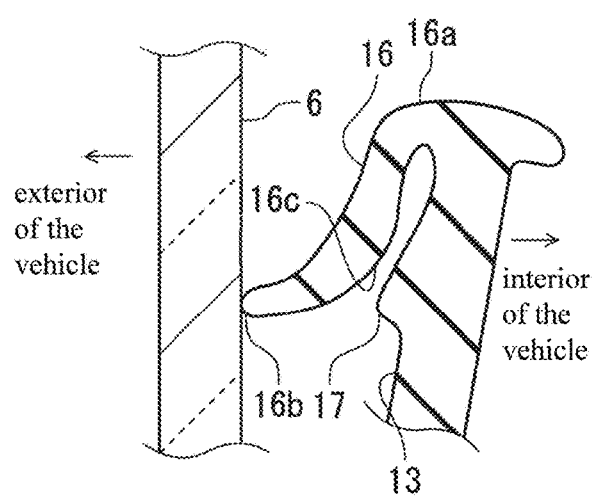
FIGS. 2A, 2B, and 2C are a cross sectional view for explaining a mechanism of the glass run according to the embodiment of the present disclosure.

As illustrated in FIG. 2A, when the door glass 6 is not received any impact and is placed at a regular position, the interior lip 16 has a base end portion 16a extending toward the bottom wall 14 and is curved to extend toward the exterior of the vehicle (to a door glass 6 side) as extending toward a distal end portion 16b, as described above. Specifically, the interior lip 16 is curved to have an apex of a curve 16c located proximate to a midsection between the base end portion 16a and the distal end portion 16b. In this instance, the interior lip 16 does not contact the protuberance 17 formed on the interior side wall 13.

Figure 2B:
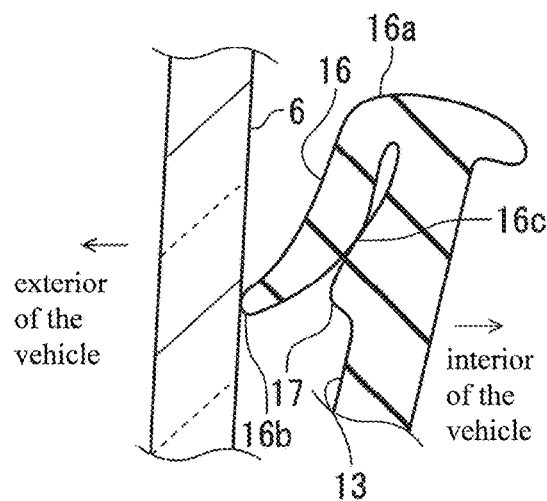

Then, when the door glass 6 is received, for example, an impact and moves toward an interior of the vehicle, the distal end portion 16b of the interior lip 16 is first pressed toward the interior of the vehicle by the door glass 6 as illustrated in FIG. 2B. Thereby, the whole interior lip 16 from the base end portion 16a to the distal end portion 16b deforms toward the interior of the vehicle with respect to the base end portion 16a acting as a fulcrum. As a result, the interior lip 16 contacts the protuberance 17. The apex of the curve 16c and the protuberance 17 are preferably positioned such that a portion of the interior lip 16 proximate to the apex of the curve 16c contacts the protuberance 17 in this instance. For that reason, the protuberance 17 is preferably located to be most proximate to the apex of the curve 16c of the interior lip 16 in the state shown in FIG. 2A.

Figure 2C:
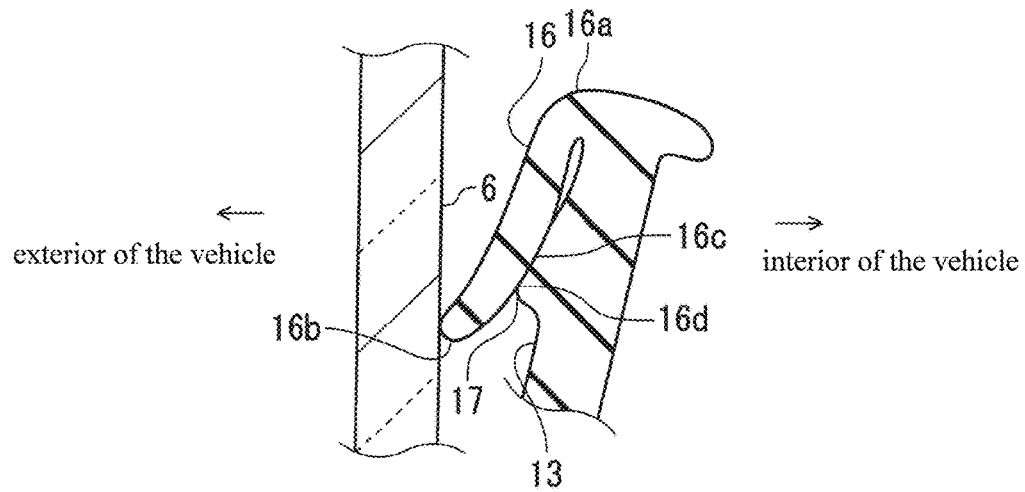

When the door glass 6 moves toward the interior of the vehicle, the distal end portion 16b of the interior lip 16 is pressed by the door glass 6 further from the state shown in FIG. 2B and the interior lip 16 deforms to be the state shown in FIG. 2C. Specifically, as illustrated in FIG. 2C, a portion of the interior lip 16 from the portion proximate to the apex of the curve 16c in contact with the protuberance 17, to the distal end portion 16b, deforms further toward the interior of the vehicle with respect to the portion proximate to the apex of the curve 16c in contact with the protuberance 17, which acts as a fulcrum. Thereby, the portion of the interior lip 16 between the portion proximate to the apex of the curve 16c and the distal end portion 16b also contacts the protuberance 17. The distal end portion 16b may not contact the protuberance 17 during such deformation of the interior lip 16 and the protuberance 17 may be so located at a position that the distal end portion 16b does not contact the protuberance 17.

As the interior lip 16 and the protuberance 17 are configured as described above, the fulcra of the deformation progressively shift during the deformation of the interior lip 16, as illustrated in FIGS. 2A to 2C. Thus, as described above, the whole interior lip 16 deforms toward the interior of the vehicle with respect to the base end portion 16a acting as a fulcrum until the interior lip 16 contacts the protuberance 17. After the portion of the interior lip 16 proximate to the apex of the curve 16c contacts the protuberance 17, the contacting portion proximate to the apex of the curve 16c acts as a fulcrum and then the portion of the interior lip 16 between the contacting portion and the distal end portion 16b then deforms toward the interior of the vehicle. As illustrated in FIG. 2C, the portion between the apex of the curve 16c and the distal end portion 16b then also contacts the protuberance 17 to allow a portion 16d of the contacting portion most proximate to the distal end portion 16b to be a fulcrum. A portion between the portion 16d and the distal end portion 16b then further deforms toward the interior of the vehicle. While a point of application that is a portion of the interior lip 16 pressed by the door glass 6 is the distal end portion 16b and remains the same, the fulcrum for the deformation of the interior lip 16 progressively shifts from the base end portion 16a, to the apex of the curve 16c and to the portion 16d between the apex of the curve 16c and the distal end portion 16b, as described above. As the interior lip 16 deforms, a distance from the fulcrum to the point of application is thus progressively smaller. This increases force required for the deformation of the interior lip 16 and thus, reaction force of the interior lip 16 against pressure of the door glass 6 is increased as the interior lip 16 deforms. According to the embodiment, rattles of the door glass 6 can be thus effectively prevented by the support of the interior lip 16 and hence rattling noise of the door glass 6 is also effectively reduced.

Further, in the embodiment, the interior lip 16 has the base end portion 16a extending toward the bottom wall 14 and is curved to extend toward the exterior of the vehicle (to the door glass 6 side) as extending toward the distal end portion 16b and is thus particularly configured to have a smaller distance between the apex of the curve 16c and the protuberance 17 as describe above, so that generation of noise occurred by contact of the interior lip 16 and the protuberance 17 can be suppressed. Thus, the generation of noise attributed to the rattle of the door glass 6 can be further suppressed.

The embodiment is explained with the example of the glass run for the front door 2; however, the embodiment can be naturally adopted in part of the rear door 4, etc., in which other door glass and glass run are provided.

Example

An example for explaining in detail a glass run according to the present disclosure is presented below. The example uses a glass run having features of the present disclosure and a glass run of prior art and compares levels of rattling noises generated by rattles of a door glass in the respective cases. Methods and results of the example are described below with reference to FIGS. 3 and 4.

Figure 3A:
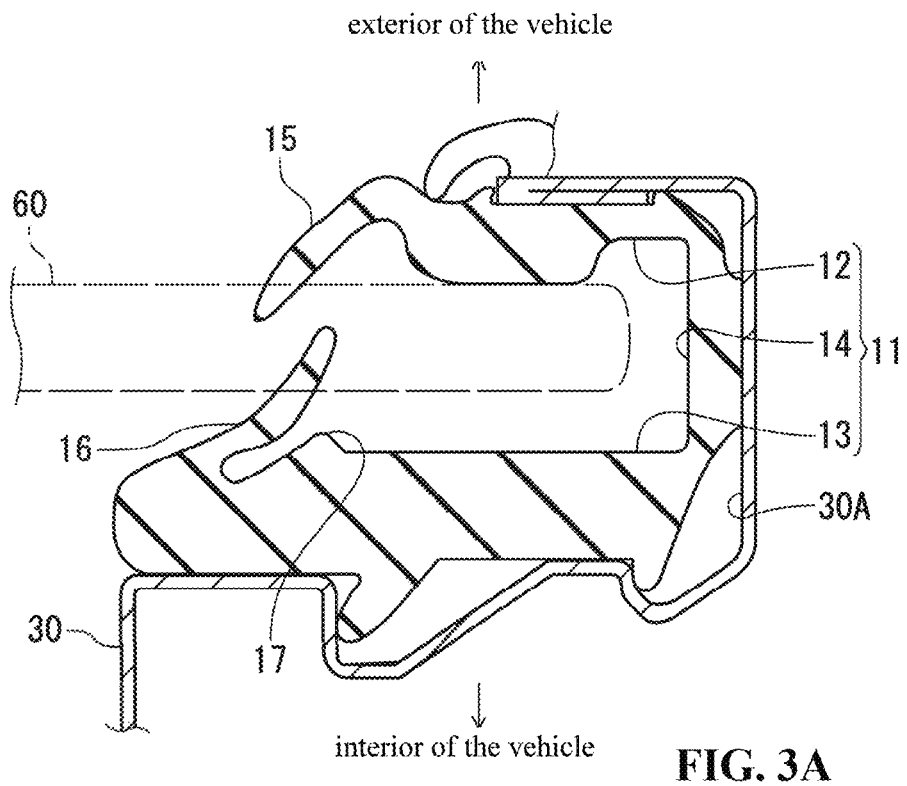
FIG. 3A is a cross sectional view illustrating a glass run in an example and FIG. 3B is a cross sectional view illustrating a glass run in a comparative example.
Figure 3B:
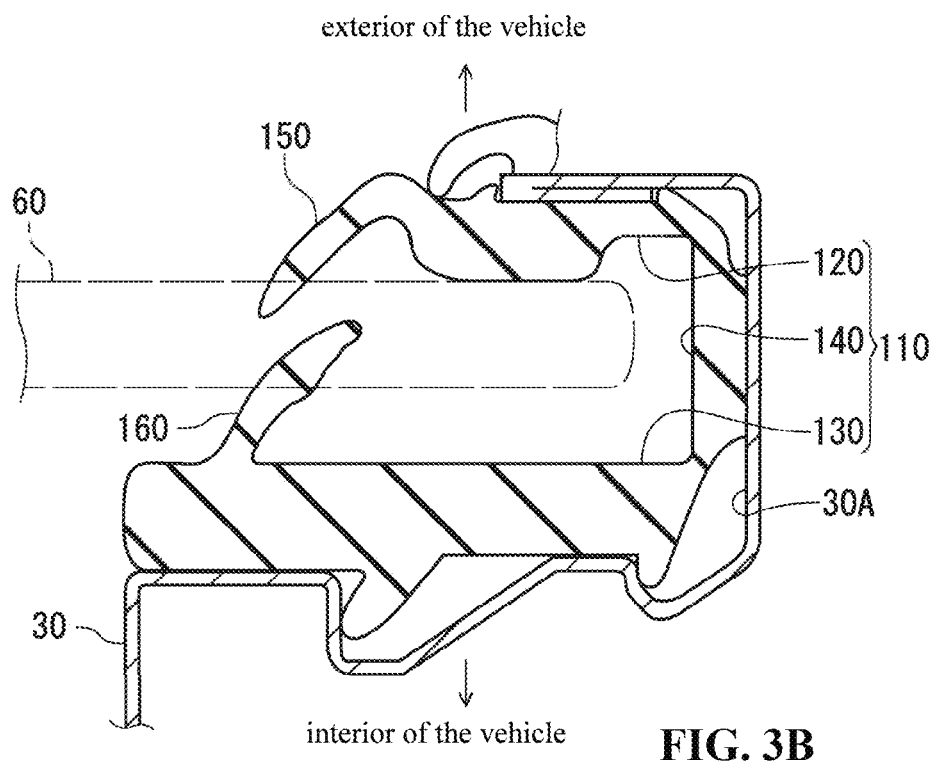

As illustrated in FIG. 3A, a glass run used in the example is mounted in a recessed portion 30A of a sash-like jig 30. The glass run used in the example includes an interior lip 16 first extending toward a bottom wall 14 and then curved to extend toward the exterior of the vehicle as extending toward a distal end portion, and a protuberance 17 formed on an interior side wall 13, as in the glass run of the present disclosure. As illustrated in FIG. 3B, a glass run used in a comparative example is also mounted in a recessed portion 30A of a sash-like jig 30, as in the glass run of the example. The glass run used in the comparative example has a body part 110 generally U-shaped in cross-sectional view and including exterior and interior side walls 120, 130 and a bottom wall 140; an exterior lip 150 formed on the exterior side wall 120; and an interior lip 160 formed on the interior side wall 130, as in the glass run of the example. The glass run of the comparative example then differs from that of the example, in that the interior lip 160 is oriented to the bottom wall 140 as extending toward the exterior of the vehicle and no protuberance is formed on the interior side wall 130, as in the prior art.

As illustrated in FIGS. 3A and 3B, a plate glass 60 assumed as a door glass is disposed in these glass runs of the example and the comparative example to contact the exterior side wall, and vibration is applied to the plate glass 60 in interior and exterior directions (a direction perpendicular to a surface of the plate) by using a shaker. The plate glass has a thickness of 5.16 mm, vibration frequency is 20 Hz, and amplitude is 3 mm. A microphone is placed on a top surface of the plate glass at a position 20 mm from the center of the plate glass to measure rattling noise generated by rattles of the plate glass. As results of the measurement, overall values (OA values) for 1 to 4 kHz are shown in FIG. 4.

Figure 4:
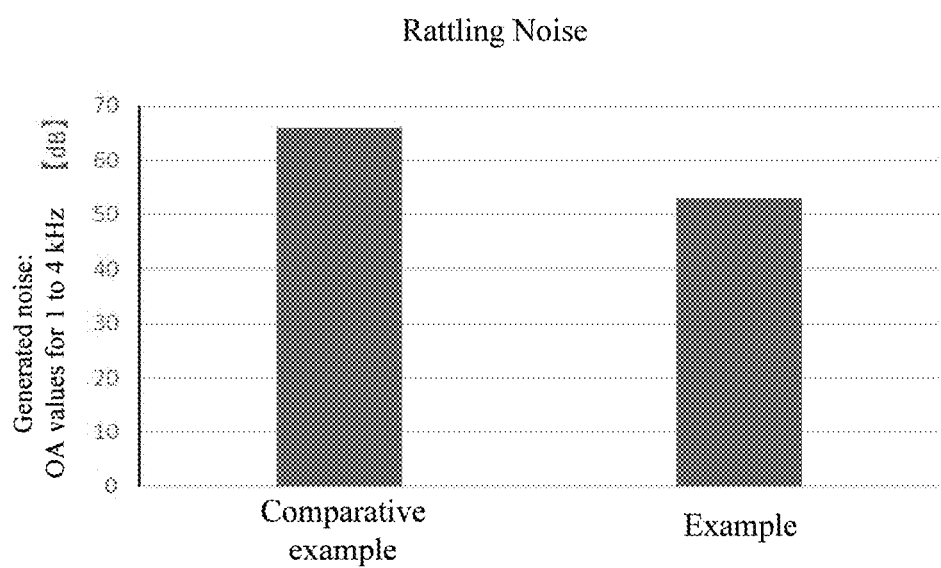
FIG. 4 is a graph showing results of measured rattling noises in the example and the compared example.

As shown in FIG. 4, while the glass run of the comparative example generated noise of 66 dB due to the vibration of the plate glass, the glass run of the example generated noise of 53 dB due to the vibration of the plate glass. The glass run of the example thus significantly suppressed the generated noise by the vibration of the plate glass, as compared to the glass run of the comparative example. It became clear from the results that the glass run according to the present disclosure suppressed more rattling noise generated by the rattle of the door glass than the prior art glass run.

As described in the forgoing, the glass run according to the present disclosure prevents the rattle of the door glass and efficiently reduces the rattling noise of the door glass, and is thus particularly useful.

The invention claimed is:

1. A glass run adapted to be attached along a frame body of a vehicle door and to seal a gap between the frame body and a door glass for opening and closing a window of the door, the glass run comprising:

a body part including exterior and interior side walls and a bottom wall connecting the exterior and interior side walls;

an exterior lip projecting from the exterior side wall toward the bottom wall and configured to slidably contact an exterior side of the door glass; and an interior lip projecting from the interior side wall toward the bottom wall and configured to slidably contact an interior side of the door glass, wherein the interior lip includes a base end portion extending toward the bottom wall and is curved to be oriented concavely toward an exterior of the vehicle as extending to its distal end portion, the interior side wall includes a protuberance protruding toward the exterior of the vehicle, the protuberance is positioned to be able to contact the interior lip when the interior lip is pressed toward an interior of the vehicle by the door glass to deform, and the interior lip is configured such that only the distal end portion of the interior lip contacts the door glass.

2. The glass run according to claim 1, wherein the interior lip has an apex of a curve positioned most proximate to the protuberance between the base end portion and the distal end portion.

3. The glass run according to claim 2, wherein the interior lip is configured such that when the interior lip is pressed toward the interior of the vehicle by the door glass to deform, the apex of the curve contacts the protuberance and then a portion between the apex of the curve and the distal end portion contacts the protuberance.

* * * * *